(12) United States Patent
Sibley, Jr. et al.

(10) Patent No.: US 9,723,692 B2
(45) Date of Patent: Aug. 1, 2017

(54) FIFTH WHEEL COUPLING DETECTION SYSTEM WITH INSPECTION AND INDICATION LIGHTING ARRANGEMENT

(71) Applicant: SAF-HOLLAND, Inc., Holland, MI (US)

(72) Inventors: Richard Sibley, Jr., Grand Haven, MI (US); Michael Ginocchio, Grand Haven, MI (US); Ahmad Nizam Mohamad-Jembari, Grand Haven, MI (US); Andrew L. Wallner, Grand Rapids, MI (US)

(73) Assignee: SAF-HOLLAND, Inc, Holland, MI (US)

( * ) Notice: Subject to any disclaimer, the term of this patent is extended or adjusted under 35 U.S.C. 154(b) by 0 days.

(21) Appl. No.: 15/099,925

(22) Filed: Apr. 15, 2016

(65) Prior Publication Data

US 2016/0339836 A1 Nov. 24, 2016

Related U.S. Application Data

(60) Provisional application No. 62/164,215, filed on May 20, 2015.

(51) Int. Cl.
*B60Q 1/30* (2006.01)
*H05B 37/02* (2006.01)
(Continued)

(52) U.S. Cl.
CPC ......... *H05B 37/0227* (2013.01); *B62D 53/08* (2013.01); *B60Q 1/24* (2013.01); *Y02B 20/42* (2013.01)

(58) Field of Classification Search
CPC .. B60Q 1/0023; B60Q 1/305; H05B 37/0218; H05B 37/0227
See application file for complete search history.

(56) References Cited

U.S. PATENT DOCUMENTS 2,982,566 A 5/1951 Geerds
3,013,815 A 12/1961 Geerds
(Continued)

FOREIGN PATENT DOCUMENTS

DE 3018905 11/1980
DE 3604185 8/1987
(Continued)

OTHER PUBLICATIONS

United States Patent Office; International Search Report; Jul. 6, 2016.

*Primary Examiner* — Alexander H Taningco
*Assistant Examiner* — Kurtis R Bahr
(74) *Attorney, Agent, or Firm* — Price Heneveld LLP

(57) ABSTRACT

A system for monitoring a trailer hitch assembly includes a first sensor sensing the position of a kingpin of a trailer relative to a throat of a hitch plate, a second sensor sensing a position of the locking mechanism movable between locked and unlocked positions, a control circuit coupled with the first sensor and determining whether the first sensor indicates a proper location of the kingpin relative to the throat and whether the second sensor indicates that the locking mechanism is in the locked position, and a light source proximate the throat of the kingpin and activated when the control circuit determines that the kingpin is properly located and that the locking mechanism is in the locked position, such that the light source illuminates the throat and the kingpin assisting visual inspection of the position of the kingpin relative to the throat.

42 Claims, 5 Drawing Sheets

(51) Int. Cl.
    *B62D 53/08*    (2006.01)
    *B60Q 1/24*    (2006.01)

(56) References Cited

U.S. PATENT DOCUMENTS

| | | | |
|---|---|---|---|
| 3,535,679 A | 10/1970 | Connors | |
| 3,640,549 A | 2/1972 | Neff et al. | |
| 3,697,974 A * | 10/1972 | Harris | B62D 53/12 200/51.09 |
| 3,868,127 A | 2/1975 | Marulic et al. | |
| 4,258,421 A | 3/1981 | Juhasz et al. | |
| 4,428,595 A | 1/1984 | Martin et al. | |
| 4,614,355 A | 9/1986 | Koch | |
| 4,649,369 A | 3/1987 | Walker et al. | |
| 4,669,748 A | 6/1987 | LeVee | |
| 4,685,695 A | 8/1987 | LeVee | |
| 4,809,177 A | 2/1989 | Windle et al. | |
| 5,108,123 A | 4/1992 | Rubenzik | |
| 5,456,484 A | 10/1995 | Fontaine | |
| 5,477,207 A | 12/1995 | Frame, Sr. et al. | |
| 5,506,773 A | 4/1996 | Takaba et al. | |
| 5,549,166 A | 8/1996 | Orbach et al. | |
| 5,583,770 A | 12/1996 | Sekido et al. | |
| 5,696,676 A | 12/1997 | Takaba | |
| 5,757,645 A | 5/1998 | Schneider et al. | |
| 5,861,802 A * | 1/1999 | Hungerink | B62D 53/12 280/433 |
| 5,917,408 A | 6/1999 | Cardillo et al. | |
| 5,964,813 A | 10/1999 | Ishii et al. | |
| 6,031,430 A | 2/2000 | Heimlicher | |
| 6,064,198 A | 5/2000 | Wolf et al. | |
| 6,100,794 A | 8/2000 | Hillier | |
| 6,285,278 B1 * | 9/2001 | Schutt | B62D 53/10 280/435 |
| 6,452,485 B1 | 9/2002 | Schutt et al. | |
| 6,592,230 B2 * | 7/2003 | Dupay | B62D 53/10 359/838 |
| 6,783,266 B2 * | 8/2004 | McCoy | B60D 1/485 340/468 |
| 6,798,217 B2 | 9/2004 | Scheible | |
| 7,932,816 B2 * | 4/2011 | Schmidt | B60D 1/28 340/431 |
| 8,615,347 B2 | 12/2013 | Alguera Gallego et al. | |
| 2004/0075241 A1 * | 4/2004 | Alguera | B62D 53/10 280/432 |
| 2005/0121921 A1 | 6/2005 | Alguera et al. | |
| 2006/0186636 A1 | 8/2006 | Schutt et al. | |
| 2008/0265545 A1 | 10/2008 | Hicks et al. | |
| 2011/0118942 A1 | 5/2011 | Alguera et al. | |

FOREIGN PATENT DOCUMENTS

| | | |
|---|---|---|
| DE | 3803931 | 8/1989 |
| DE | 4013672 | 10/1991 |
| DE | 19820139 | 11/1999 |

* cited by examiner

FIFTH WHEEL COUPLING DETECTION SYSTEM WITH INSPECTION AND INDICATION LIGHTING ARRANGEMENT

BACKGROUND OF THE INVENTION

The present invention is directed to a system for monitoring the coupling of a trailer to a trailer hitch assembly that is mounted on a truck chassis, and in particular is directed to a system that indicates whether the trailer is properly coupled to the trailer hitch assembly and provides a clear indication to the truck operator, as well as providing a light source that assists the operator with inspecting whether a proper coupling configuration has been achieved.

BRIEF SUMMARY OF THE INVENTION

One aspect of the present invention is a system for monitoring a trailer hitch assembly having a hitch plate with a throat for receiving a kingpin of a trailer and a locking mechanism for locking the kingpin in the throat, the system including a first sensor for sensing the position of the kingpin of the trailer relative to the throat of the hitch plate, a second sensor for sensing a position of the locking mechanism that is movable between an unlocked position wherein the kingpin is removable from within the throat of the hitch plate, and a locked position wherein the kingpin is secured within the throat of the hitch plate by the locking mechanism, and a control circuit operably coupled with the first sensor and the second sensor and determining whether the first sensor indicates a proper location of the kingpin of the trailer relative to the throat of the hitch plate and determining whether the second sensor indicates that the locking mechanism is in the locked position. The system further includes a first light source located substantially proximate the throat of the kingpin, wherein the first light source is activated when the control circuit determines that the kingpin of the trailer is in the proper location relative to the throat of the hitch plate and that the locking mechanism is in the locked position, such that the first light source illuminates the throat of the hitch plate and the kingpin assisting an operator in conducting a visual inspection of the position of the kingpin relative to the throat of the hitch plate.

Another aspect of the present invention is a system for monitoring a trailer hitch assembly having a hitch plate with a throat for receiving a kingpin of a trailer and a locking mechanism for locking the kingpin in the throat, the system including a first sensor for sensing the position of the kingpin of the trailer relative to the throat of the hitch plate, a second sensor for sensing a position of the locking mechanism that is movable between an unlocked position wherein the kingpin is removable from within the throat of the hitch plate, and a locked position wherein the kingpin is secured within the throat of the hitch plate by the locking mechanism, and a control circuit operably coupled with the first sensor and the second sensor and determining whether the first sensor indicates a proper location of the kingpin of the trailer relative to the throat of the hitch plate and determining whether the second sensor indicates that the locking mechanism is in the locked position. The system includes a first light source located external to a cab of a towing vehicle and generally proximate to the hitch plate and adapted to provide a warning to an operator of at least one of an improper location of the kingpin relative to the throat, locking mechanism not being located in the locked position, and the exceeding of a predetermined time between the determination of the proper locating of the kingpin with the throat and the determination that the locking mechanism is in the locked position.

Yet another aspect of the invention is a system for monitoring a trailer hitch assembly having a hitch plate with a throat for receiving a kingpin of a trailer and a locking mechanism for locking the kingpin in the throat, the system including a first sensor for sensing the position of the kingpin of the trailer relative to the throat of the hitch plate, a second sensor for sensing a position of the locking mechanism that is movable between an unlocked position wherein the kingpin is removable from within the throat of the hitch plate, and a locked position wherein the kingpin is secured within the throat of the hitch plate by the locking mechanism, and a control circuit operably coupled with the first sensor and the second sensor and determining whether the first sensor indicates a proper location of the kingpin of the trailer relative to the throat of the hitch plate and determining whether the second sensor indicates that the locking mechanism is in the locked position. The system further includes a first light source located substantially proximate the throat of the kingpin, wherein the first light source is activated when the control circuit determines that the kingpin of the trailer is in the proper location relative to the throat of the hitch plate and that the locking mechanism is in the locked position, such that the first light source illuminates the throat of the hitch plate and the kingpin assisting an operator in conducting a visual inspection of the position of the kingpin relative to the throat of the hitch plate, and a second light source located generally proximate to the hitch plate and adapted to provide a warning to an operator of at least one of an improper location of the kingpin relative to the throat, the locking mechanism not being located in the locked position, and the exceeding of a predetermined time between the determination of the proper locating of the kingpin with the throat and the determination that the locking mechanism is in the locked position. The system still further includes a first indicator separate from the first light source and coupled to the control circuit such that the first indicator is activated when the first light source is activated, and a second indicator separate from the second light source and coupled to the control circuit such that the second indicator is activated when the second light source is activated.

The present inventive system for monitoring a trailer hitch assembly provides feedback to the operator of whether a satisfactory coupling configuration has been achieved, and/or whether a hazardous coupling configuration exists, as well as providing the operator with lighting adapted to assist the operator in verifying the coupling configuration, thereby significantly reducing the chances of vehicle damage and increasing the overall safety of vehicle operation. This system may be easily retrofitted onto most vehicle configurations, is extremely reliable and durable, is capable of a long operating life, and is particularly well adapted for the proposed use.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
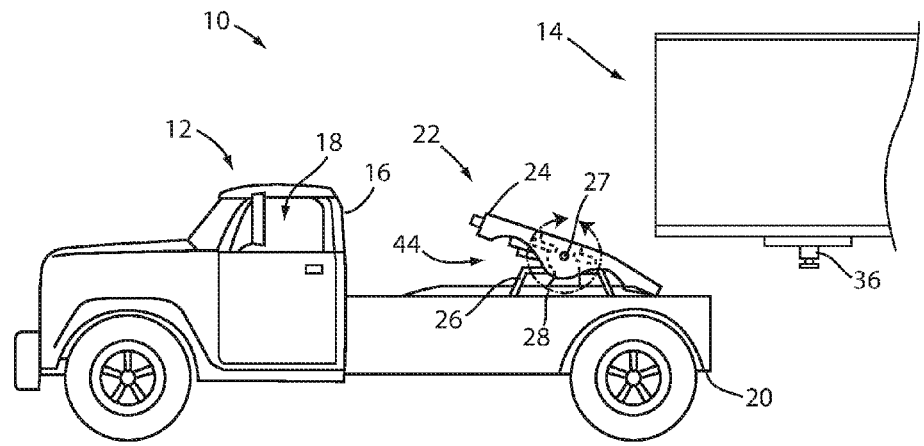
FIG. 1 is a side view of a truck/tractor including a system embodying the present invention for monitoring a trailer hitch assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
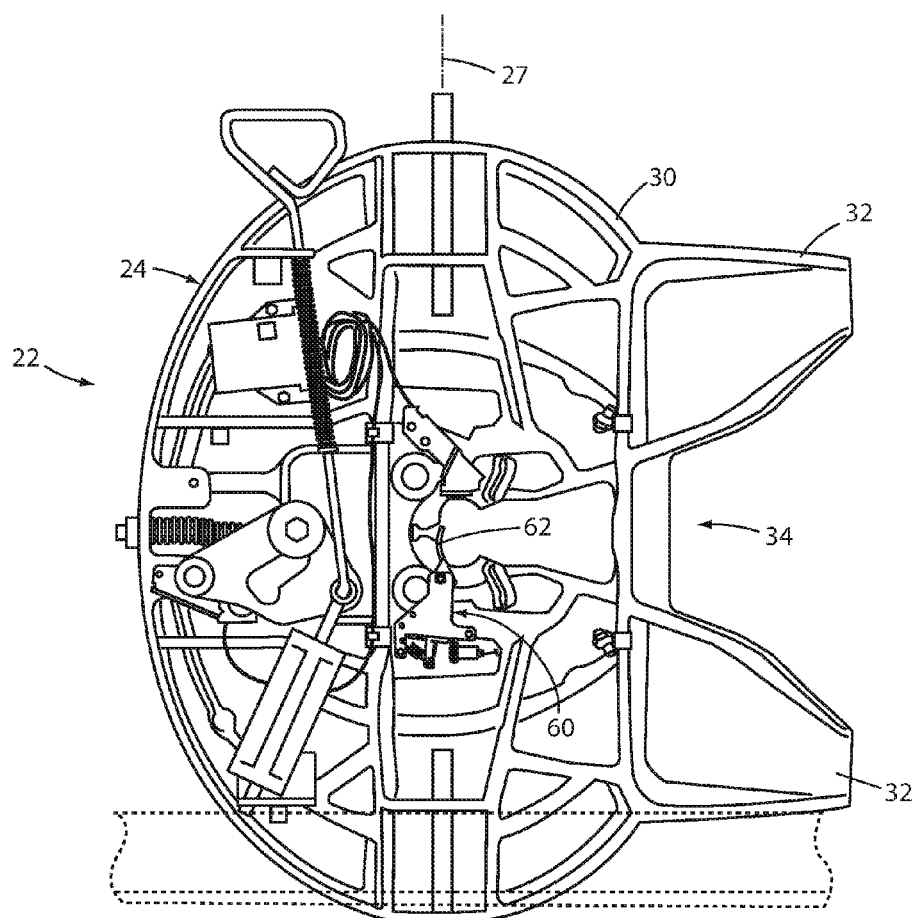
FIG. 2 is a bottom plan view of a trailer hitch assembly.

The reference numeral 10 (FIG. 1) generally designates a tractor/trailer vehicle combination, including a towing vehicle 12, such as a semi-tractor, and a towed vehicle or trailer 14. In the illustrated example, the towing vehicle 12 includes a cab 16 defining an internal space 18, and a rearwardly-extending frame assembly 20 supporting a fifth wheel plate assembly 22 thereon. The fifth wheel plate assembly 22 includes a fifth wheel hitch plate 24 pivotably supported above the frame assembly 20 by a mounting arrangement 26 such that the fifth wheel hitch plate 24 is pivotable about a pivot axis 27 in the directions 28. The fifth wheel hitch plate 24 (FIG. 2) includes a planar body portion 30 and a pair of rearwardly-extending flanges 32 defining a throat 34 therebetween that is adapted to receive a kingpin 36 (FIG. 1) of the trailer 14 therein.

Figure 3:
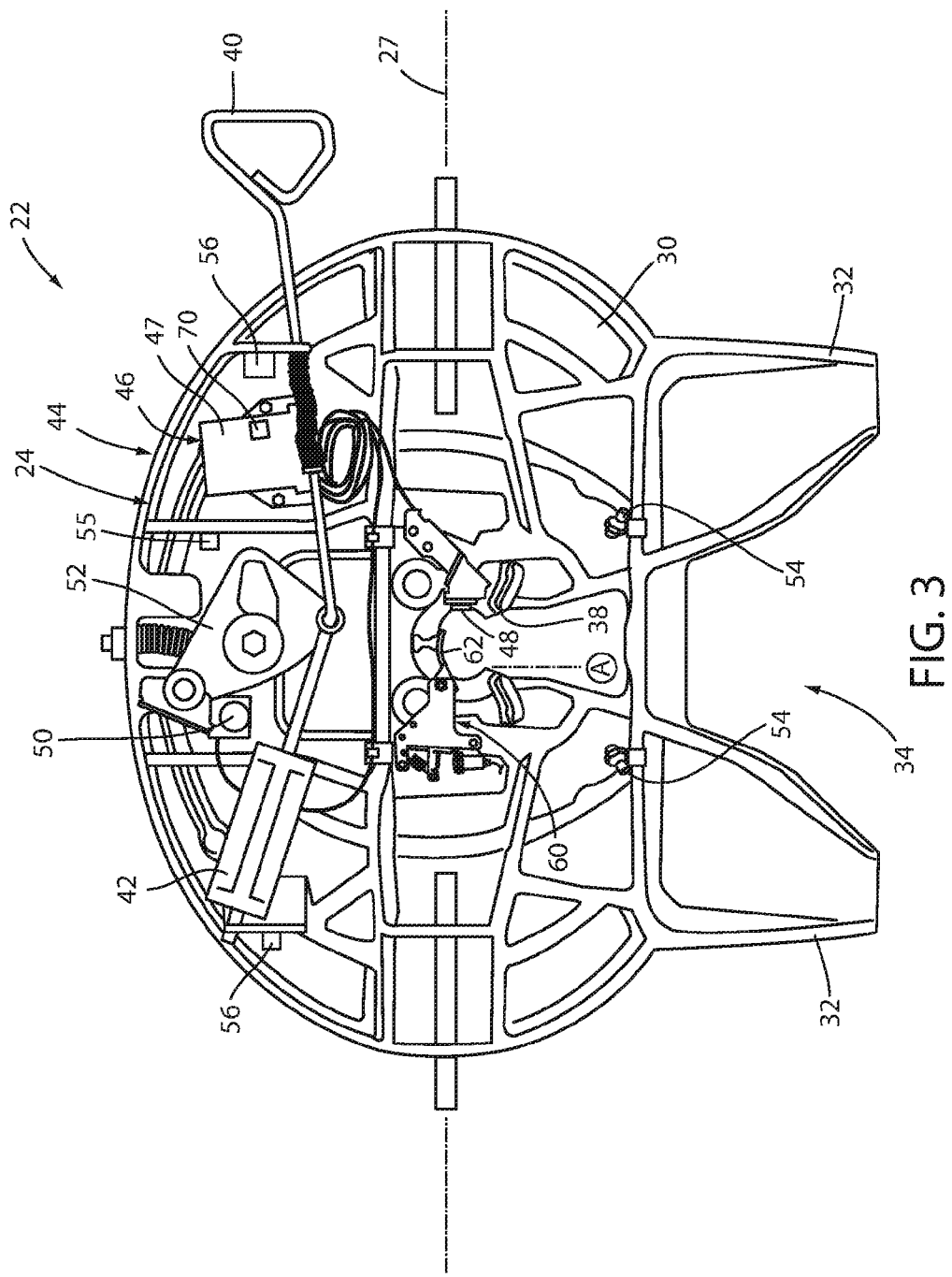
FIG. 3 is a bottom plan view of the trailer hitch plate with a locking arrangement shown in an unlocked position.

The fifth wheel hitch plate assembly 22 further includes a locking mechanism 38 movable between an unlocked position A (FIG. 3), wherein the kingpin 36 may be moved into and removed from the throat 34 of the hitch plate 24, and a locked position B (FIG. 4), wherein the kingpin 36 is secured within the throat 34 of the hitch plate 24 as further described below. A locking mechanism 38 can be moved between the unlocked position A and the locked position B either manually via an engagement/release handle, and/or via a mechanical assistance, such as a pneumatic cylinder 42. Of course, other automatic or mechanically assisted systems could be utilized, such as electric actuators, various gear trains and the like.

A system 44 (FIGS. 1 and 3) for monitoring the locking and unlocking condition of the trailer hitch assembly comprising the fifth wheel hitch plate assembly 22 and the kingpin 36 includes a control circuit 46 including a controller 47 coupled to a kingpin sensor 48 located proximate the throat 34 of the hitch plate 24 and configured to sense the position of the kingpin 36 within the throat 34 of the hitch plate 24. A lock sensor 50 is positioned proximate a linkage arm 52 that mechanically couples the engagement/release handle 40 and the pneumatic cylinder 42 with the locking mechanism 38, and is configured to sense the position of the locking arm 52 and thereby the position of the locking mechanism 38 between the unlocked position A and the locked position B. In the illustrated example, the kingpin sensor 48 and the lock sensor 50 each comprise Hall-effect type sensors, such as that as disclosed in Schutt et al., U.S. Pat. No. 7,548,155, the disclosure of which is incorporated herein by reference in its entirety. Of course, other sensors adapted to sense the positions of the kingpin 36 and the locking mechanism 38 may also be utilized, such as other forms of proximity sensors, non-contact sensors, contact sensors, and the like. For example, the proximity sensor 50 may be replaced or supplemented by a contact sensor arrangement 60 that includes a flag 62 positioned proximate a fully seated position of the kingpin 36 within the throat 34 of the hitch plate 24. The flag 62 includes a radius that is similar to the radius of the kingpin 36, and is movable between a first position when the kingpin 36 is not located within the proper position within the throat 34, and a second position when the kingpin 36 is properly positioned within the throat 34. It is noted that power may be supplied to the system 44 via a power source associated with the towing vehicle 12, or may be provided by an independent power source, such as a battery pack situated within the overall housing for the controller 47, combinations thereof, or other suitable power arrangements.

The system 44 further includes an auxiliary or inspection light source such as LED lights 54 operably coupled to the controller 47 and positioned proximate the throat 34 of the fifth wheel hitch plate 24. In the illustrated example, the LED lights 54 emit a white light and are adapted to illuminate the area of the throat 34 within which the kingpin 36 is received, thereby assisting a vehicle operator in conducting a visual inspection of whether the kingpin 36 is properly locked within the throat 34 of the hitch plate 24 and whether the locking mechanism 38 is properly configured in the locked position B, as described below. It is further contemplated that the control circuit 44 may be configured to automatically switch the light source 54 to an off position after a preselected amount of time, or when the vehicle 12 begins to move in a forward direction. The system 44 further includes a hazard or warning light source such as LEDs 56 that are operably coupled to the controller 47 and are configured to provide the operator with a visual indication of an improper coupling configuration, as described below. In the illustrated example, the LED lights emit a red light, and are configured to flash if a proper locked position B is not reached, as described below.

Figure 4:
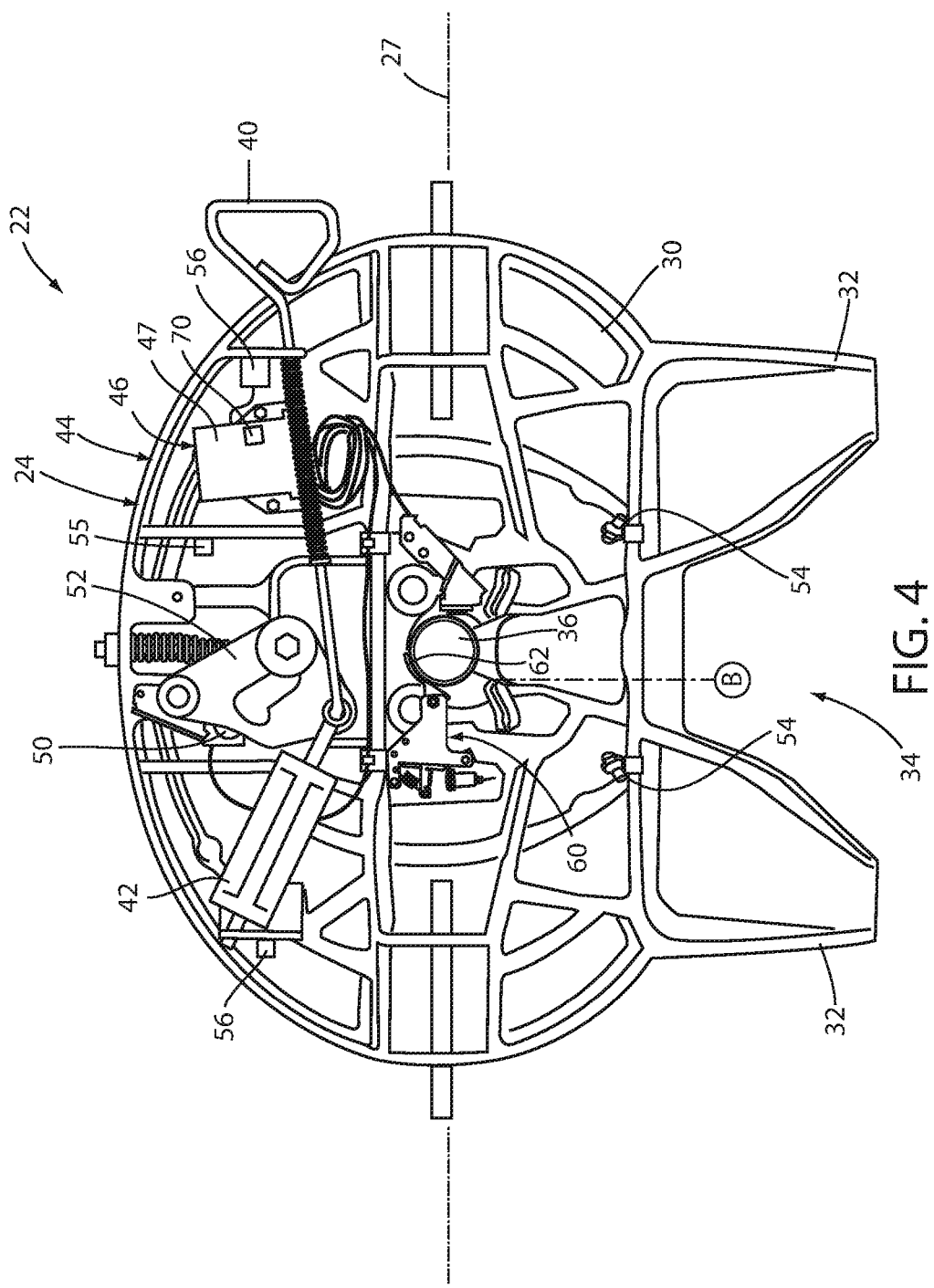
FIG. 4 is a bottom plan view of the trailer hitch plate with a kingpin properly located within a throat of the hitch plate and the locking arrangement in a proper lock configuration.

In operation, the towing vehicle 50 is positioned relative to the trailer 14 such that the kingpin 36 is guided into the throat 34 of the hitch plate 24. The controller 47 monitors the proper positioning of the kingpin 36 within the throat 34 of the hitch plate 24 via the kingpin sensor 48, and the position of the locking mechanism 38 via the lock sensor 50. Should the kingpin sensor 48 register the proper positioning of the kingpin 36 within the throat 34 of the hitch plate 24 and the lock sensor 50 register that the locking mechanism 38 is in a proper locked position B, then the controller 47 will register a proper locking configuration. As a result of registering this proper locking configuration, the controller 47 may be adapted to provide a visual indication of this proper locking arrangement by illuminating a third light source (55), such as a green-colored LED lighting arrangement. The controller 47 actuates the inspection light source 54 such that the operator may conduct a visual inspection of the overall configuration of the kingpin 36 within the throat 34 of the hitch plate 24, as well as whether the locking mechanism 38 is arranged in the proper locked position B (FIG. 4).

Figure 5:
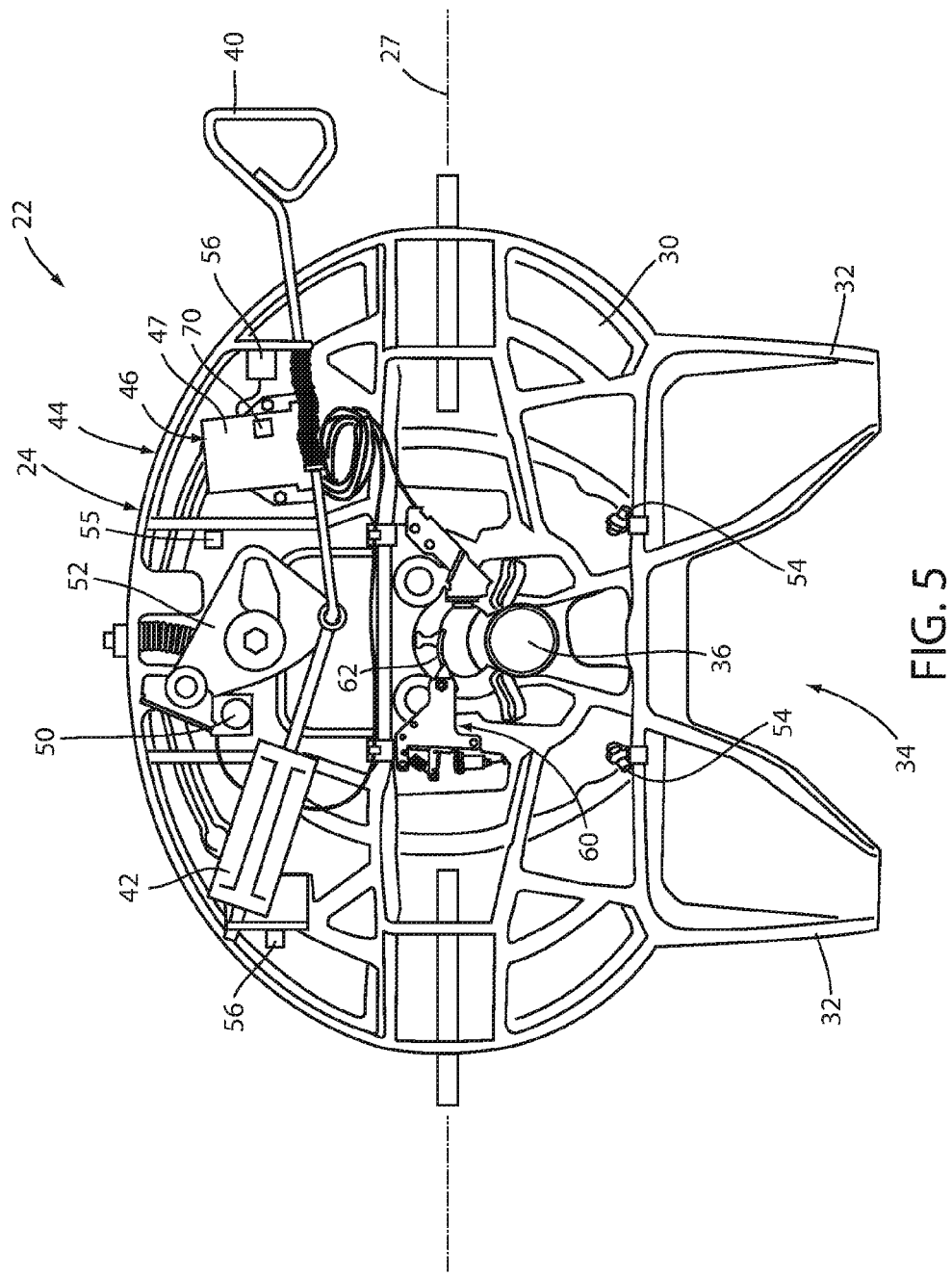
FIG. 5 is bottom plan view of the hitch plate with the kingpin improperly positioned within the throat of the hitch plate.
Figure 6:
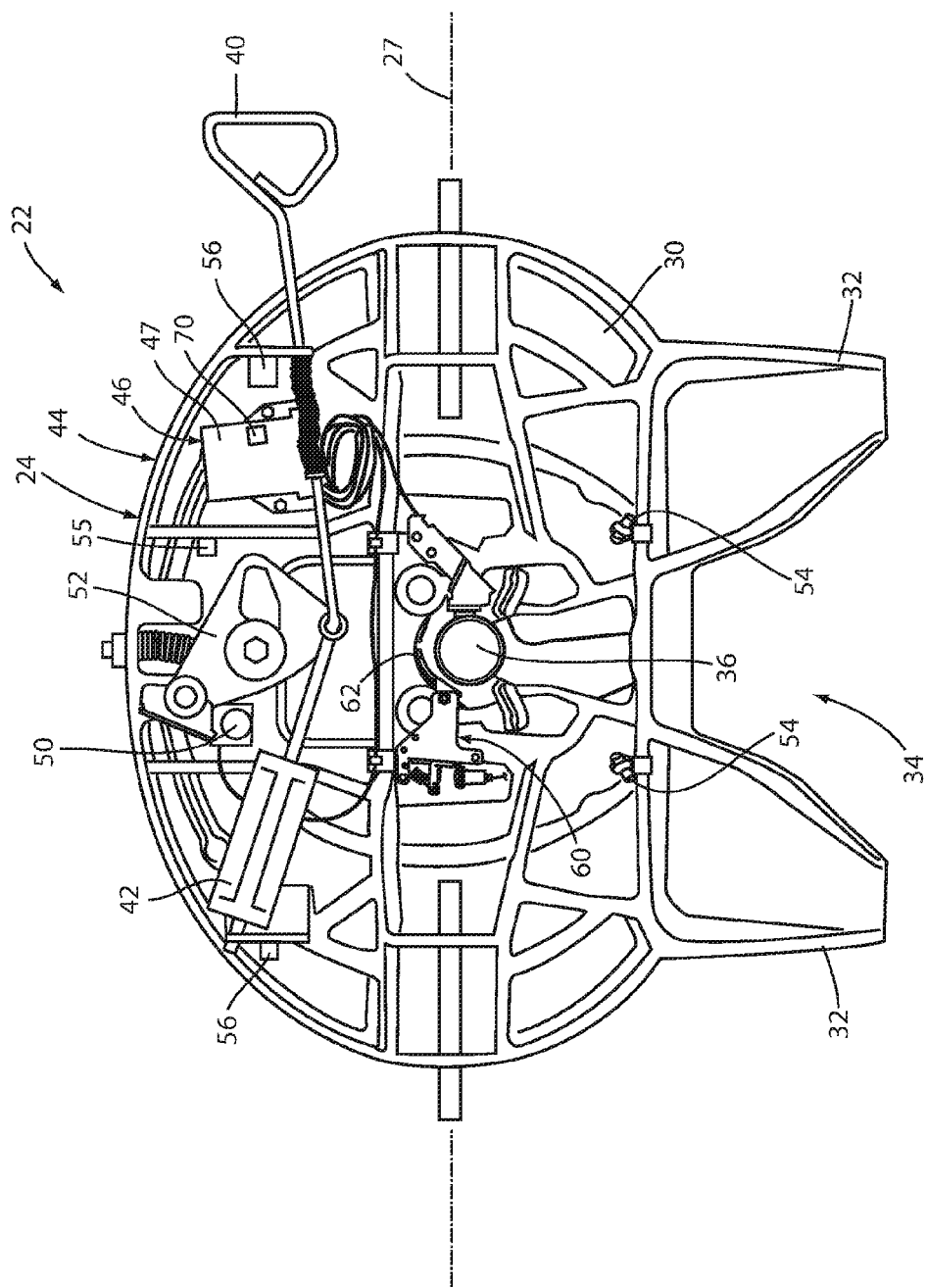
FIG. 6 is a bottom plan view of the hitch plate with the lock arrangement shown in an improper or incomplete lock configuration.

Should an improper configuration exist, such as an improper location of the kingpin 36 relative to the throat 34 or an improper positioning of the locking mechanism 38, the corresponding kingpin sensor 48 and/or the lock sensor 50 will sense such a condition, communicating the same with the controller 47. In such a state, the control circuit will illuminate a warning indicator such as a warning light source 56 so as to provide a visual indication to the operator that an improper locking configuration exists. As noted above, the light source 56 is preferably configured to provide a flashing red light, so as to attract the attention of the operator. The controller 47 may be configured to continue to activate the warning light source 56 until the kingpin 36 is completely withdrawn from within the throat 34 and a new attempt to couple the kingpin 36 with the fifth wheel hitch plate assembly 22 is initiated. Alternatively, the warning indicator may also include an audible warning and/or other arrangements to communicate to the operator that an improper or hazardous coupling condition exists. It is noted that several conditions may exist that would cause the controller to activate the warning light source 56, such as an improper location of the kingpin 36 relative to the throat 34 (FIG. 5), an improper configuration of the locking mechanism 38 (FIG. 6), and the exceeding of a preselected amount of time between the sensing of a proper location of the kingpin 36 within the throat 34 and the proper configuration of the locking mechanism 38 into the locked position B. Other configurations conditions may also cause the controller 46 to actuate the warning light source 46, such as those set forth in Schutt et al., U.S. Pat. No. 7,548,155.

The controller 47 may also be configured to record data and information related to the coupling and uncoupling actions of and interactions between the fifth wheel plate assembly 22 and the kingpin 36. For example, the controller 47 may be configured to record information and events such as presence and proper positioning of the kingpin 36 within the throat 34 of the hitch plate 24, proper positioning of the locking mechanism 38, improper or hazardous positioning of the kingpin 36 with respect to the throat 34 and/or of the locking mechanism 38, time lapse between the various activities during the coupling process such as the time lapse between the positioning of the kingpin 36 within the throat 34 and activation of the locking mechanism 38, the sequence of the activities during the coupling process, the condition of power settings to controller 47, and the like. The data and information may be utilized to improve preventative maintenance, calculating and monitoring the life cycle of the fifth wheel plate assembly 22, calculating time of operation of the overall system, allow assessments of system performance and allow for more effective trouble shooting, allow assessment of operator performance and improve operator training, and the like.

The controller 47 may further be provided with an external port 70 configured to allow the controller 47 to be connected to an external device to download the information and data stored by the controller. This information may be communicated with the operator during operation of the associated vehicle, and/or with diagnostic equipment more typically associated with maintenance facilities. Alternatively, the data and information stored within the controller 47 may be communicated via a wireless communications arrangement such as BLUETOOTH®, Wi-Fi®, telematic devices, and the like. Still further, the data and information collected by and stored within the controller 47 may be communicated via any of the lights 55, 56, 57 by flashing sequences, either directly to the operator or at a high-speed to a separate electronic device interface.

The present inventive system for monitoring a trailer hitch assembly provides feedback to the operator of whether a satisfactory coupling configuration has been achieved, as well as providing the operator with lighting adapted to assist the operator in verifying the coupling configuration, thereby significantly reducing the chances of vehicle damage and increasing the overall safety of vehicle operation. This system may be easily retrofitted onto most vehicle configurations, is extremely reliable and durable, is capable of a long operating life, and is particularly well adapted for the proposed use In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A system for monitoring a trailer hitch assembly having a hitch plate with a throat for receiving a kingpin of a trailer and a locking mechanism for locking the kingpin in the throat, the system comprising:
 a first sensor sensing the position of the kingpin of the trailer relative to the throat of the hitch plate;
 a second sensor sensing a position of the locking mechanism that is movable between an unlocked position wherein the kingpin is removable from within the throat of the hitch plate, and a locked position wherein the kingpin is secured within the throat of the hitch plate by the locking mechanism;
 a control circuit operably coupled with the first sensor and the second sensor and determining whether the first sensor indicates a proper location of the kingpin of the trailer relative to the throat of the hitch plate and determining whether the second sensor indicates that the locking mechanism is in the locked position; and
 a first light source located substantially proximate the throat of the hitch plate, wherein the first light source is activated when the control circuit determines that the kingpin of the trailer is in the proper location relative to the throat of the hitch plate and that the locking mechanism is in the locked position, such that the first light source illuminates the throat of the hitch plate and the kingpin assisting an operator in conducting a visual inspection to confirm the proper location of the kingpin relative to the throat of the hitch plate and that the locking mechanism is in the locked position.

2. The system of claim 1, wherein the first light source emits a white light.

3. The system of claim 2, wherein the first light source comprises an LED.

4. The system of claim 1, wherein the control circuit deactivates the first light source after a selected amount of time.

5. The system of claim 1, wherein the control circuit deactivates the first light source when a towing vehicle to which the control circuit is coupled begins to travel.

6. The system of claim 1, further comprising:
 an indicator separate from the first light source and coupled to the control circuit such that the indicator is activated when the first light source is activated.

7. The system of claim 6, wherein the indicator comprises a visual indicator.

8. The system of claim 7, wherein the indicator is located within a cab of a towing vehicle.

9. The system of claim 1, further comprising:
a second light source located generally proximate to the hitch plate and providing a warning to an operator of at least one of an improper location of the kingpin relative to the throat, the locking mechanism not being located in the locked position, and the exceeding of a predetermined time between the determination of the proper locating of the kingpin relative to the throat and the determination that the locking mechanism is in the locked position.

10. The system of claim 9, wherein the second light source emits a red light.

11. The system of claim 9, wherein the second light source emits a flashing light.

12. The system of claim 9, wherein the second light source comprises an LED.

13. The system of claim 9, further comprising:
an indicator separate from the second light source and coupled to the control circuit such that the indicator is activated when the second light source is activated.

14. The system of claim 9, wherein the first light source and the second light source are each connected to the hitch plate.

15. The system of claim 1, wherein the first sensor comprises a proximity sensor.

16. The system of claim 1, wherein the first sensor comprises a contact sensor.

17. The system of claim 1, wherein the first light source is connected to the hitch plate.

18. A system for monitoring a trailer hitch assembly having a hitch plate with a throat for receiving a kingpin of a trailer and a locking mechanism for locking the kingpin in the throat, the system comprising:
a first sensor sensing the position of the kingpin of the trailer relative to the throat of the hitch plate;
a second sensor sensing a position of the locking mechanism that moves between an unlocked position wherein the kingpin is removable from within the throat of the hitch plate, and a locked position wherein the kingpin is secured within the throat of the hitch plate by the locking mechanism;
a control circuit operably coupled with the first sensor and the second sensor and determining whether the first sensor indicates a proper location of the kingpin of the trailer relative to the throat of the hitch plate and determining whether the second sensor indicates that the locking mechanism is in the locked position; and
a first light source located external to a cab of a towing vehicle and generally proximate to the hitch plate and providing a warning to an operator of at least one of an improper location of the kingpin relative to the throat, the locking mechanism not being located in the locked position, and the exceeding of a predetermined time between the determination of the proper locating of the kingpin with the throat and the determination that the locking mechanism is in the locked position, wherein the first light source is positioned below the hitch plate.

19. The system of claim 18, wherein the first light source emits a red light.

20. The system of claim 18, wherein the first light source emits a flashing light.

21. The system of claim 18, wherein the second light source comprises an LED.

22. The system of claim 18, wherein the system further comprises:
an indicator separate from the first light source and coupled to the control circuit such that the indicator is activated when the first light source is activated.

23. The system of claim 18, further comprising:
a second light source located substantially proximate the throat of the kingpin, wherein the second light source is activated when the control circuit determines that the kingpin of the trailer is in the proper location relative to the throat of the hitch plate and that the locking mechanism is in the locked position, such that the second light source illuminates the throat of the hitch plate and the kingpin assists an operator in conducting a visual inspection of the position of the kingpin relative to the throat of the hitch plate.

24. The system of claim 23, wherein the second light source emits a white light.

25. The system of claim 24, wherein the second light source comprises an LED.

26. The system of claim 23, wherein the control circuit is adapted to deactivate the second light source after a selected amount of time.

27. The system of claim 23, wherein the control circuit deactivates the second light source when a towing vehicle to which the control circuit is coupled begins to travel.

28. The system of claim 23, further comprising:
an indicator separate from the second light source and coupled to the control circuit such that the indicator is activated when the second light source is activated.

29. The system of claim 28, wherein the indicator comprises a visual indicator.

30. The system of claim 29, wherein the indicator is located within a cab of a towing vehicle.

31. The system of claim 18, wherein the first sensor comprises a proximity sensor.

32. The system of claim 18, wherein the first sensor comprises a contact sensor.

33. A system for monitoring a trailer hitch assembly having a hitch plate with a throat for receiving a kingpin of a trailer and a locking mechanism for locking the kingpin in the throat, the system comprising:
a first sensor sensing the position of the kingpin of the trailer relative to the throat of the hitch plate;
a second sensor sensing a position of the locking mechanism that moves between an unlocked position wherein the kingpin is removable from within the throat of the hitch plate, and a locked position wherein the kingpin is secured within the throat of the hitch plate by the locking mechanism;
a control circuit operably coupled with the first sensor and the second sensor and determining whether the first sensor indicates a proper location of the kingpin of the trailer relative to the throat of the hitch plate and determining whether the second sensor indicates that the locking mechanism is in the locked position;
a first light source located substantially proximate the throat of the kingpin, wherein the first light source is activated when the control circuit determines that the kingpin of the trailer is in the proper location relative to the throat of the hitch plate and that the locking mechanism is in the locked position, such that the first light source illuminates the throat of the hitch plate and the kingpin assisting an operator in conducting a visual inspection of the position of the kingpin relative to the throat of the hitch plate;
a second light source located generally proximate to the hitch plate and provides a warning to an operator of at least one of an improper location of the kingpin relative to the throat, the locking mechanism not being located in the locked position, and the exceeding of a predetermined time between the determination of the proper locating of the kingpin with the throat and the determination that the locking mechanism is in the locked position;
- a first indicator separate from the first light source and coupled to the control circuit such that the first indicator is activated when the first light source is activated; and
- a second indicator separate from the second light source and coupled to the control circuit such that the second indicator is activated when the second light source is activated.

34. The system of claim 33, wherein the control circuit deactivates the first light source after a selected amount of time.

35. The system of claim 33, wherein the control circuit deactivates the first light source when a towing vehicle to which the control circuit is coupled begins to travel.

36. The system of claim 33, wherein at least one of the first indicator and the second indicator comprises a visual indicator.

37. The system of claim 33, wherein at least one of the first indicator and the second indicator is located within a cab of a towing vehicle.

38. The system of claim 33, wherein the first light source emits a white light.

39. The system of claim 33, wherein the second light source emits a red light.

40. The system of claim 39, wherein the second light source emits a flashing light.

41. The system of claim 33, wherein the first sensor comprises a proximity sensor.

42. The system of claim 33, wherein the first sensor comprises a contact sensor.

* * * * *

UNITED STATES PATENT AND TRADEMARK OFFICE
CERTIFICATE OF CORRECTION

Page 1 of 1

PATENT NO. : 9,723,692 B2
APPLICATION NO. : 15/099925
DATED : August 1, 2017
INVENTOR(S) : Sibley, Jr. et al.

It is certified that error appears in the above-identified patent and that said Letters Patent is hereby corrected as shown below:

In the Specification

Column 3, Line 40:
"directions" should read – direction –

Column 3, Line 53:
After "handle" insert -- 40 --

Column 3, Lines 59, 61:
After "assembly" and "36" insert -- , --

Column 4, Line 6:
Delete "as" (2nd occurrence)

Column 5, Line 31:
Delete "configurations"

Column 5, Line 32:
"46" should read – 56 –

Column 5, Line 49:
"preventative" should read – preventive –

Column 6, Line 14:
After "use" insert -- . --

In the Claims

Column 8, Claim 33, Line 66:
"and provides" should read – and that provides –

Signed and Sealed this
Twenty-fourth Day of July, 2018

Andrei Iancu
*Director of the United States Patent and Trademark Office*